ial Office

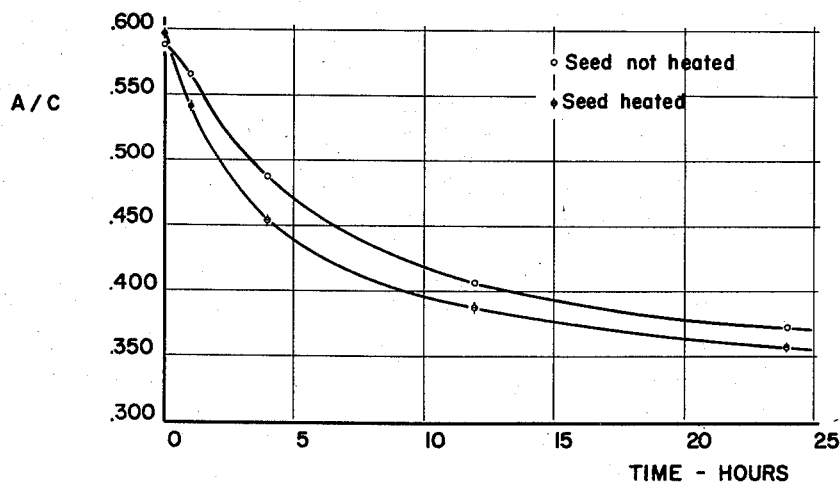
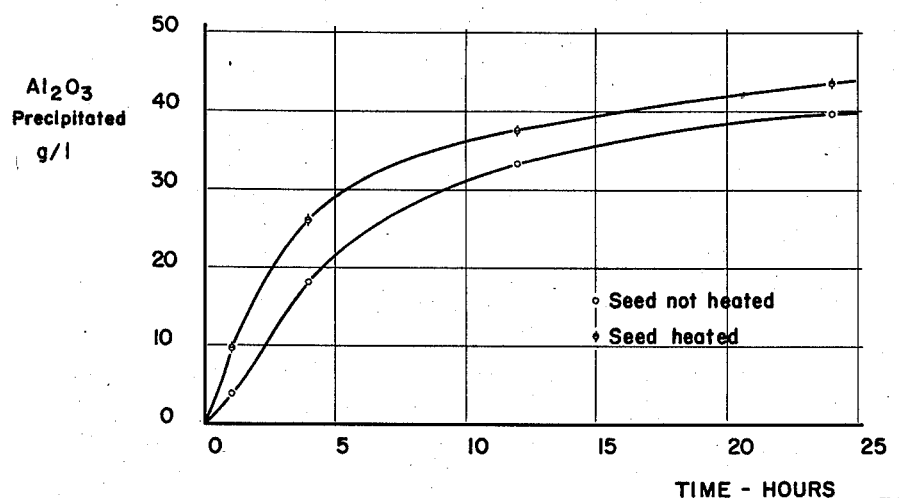

2,935,376
Patented May 3, 1960

2,935,376

PROCESS OF PRECIPITATING ALUMINA HYDRATE FROM A PREGNANT CAUSTIC ALUMINATE LIQUOR

Reginald F. Roberts, Jr., Baton Rouge, La., assignor to Kaiser Aluminum & Chemical Corporation, Oakland, Calif., a corporation of Delaware Application April 8, 1957, Serial No. 651,441

13 Claims. (Cl. 23—143)

This invention relates to precipitation of crystalline materials. More particularly, it relates to an improvement in the production of alumina wherein alumina hydrate is precipitated from a sodium aluminate liquor with addition of seeding materials. More specifically, it relates to treatment of such seeding materials to obtain a coarser and faster settling alumina hydrate during precipitation.

In the well known Bayer process for the production of alumina from aluminous ores such as bauxite, the alumina is precipitated from a clarified caustic aluminate liquor supersaturated with respect to alumina obtained by digestion of the aluminous ores in caustic liquor with subsequent removal of the ore insolubles. The clarified liquor (pregnant liquor) is then passed to the precipitation stage to recover alumina hydrate by precipitation from the liquor.

In the precipitation stage, it is the practice to process the pregnant liquor cooled to below 200° F. for the recovery of the dissolved alumina by the introduction of previously precipitated alumina hydrate as seed. The precipitation is usually allowed to proceed to a point where approximately 50% of the dissolved alumina in caustic aluminate form has been precipitated as alumina hydrate. The precipitate is usually classified in a fairly elaborate classification system and the fine material recycled to the precipitation phase as seed hydrate. The coarse fraction is washed to remove accompanying spent liquor, filtered, and calcined for the removal of both free water and water of crystallization. The major portion of the precipitated hydrate particles are below 200 mesh in size and a substantial fraction is of minus 325 mesh. Since it is desirable to have a large number of nuclei present to increase the rate of deposition of the alumina from the caustic aluminate liquor, the fine precipitated hydrate particles are used as seed. However, in some instances the coarser fractions have also been used as seed to produce an especially coarse-grained alumina. Such a process is disclosed by Houston et al. in U.S. Patent No. 2,707,669.

The precipitation of alumina from clarified caustic aluminate liquors can be accomplished in both batch and continuous precipitation systems. In batch precipitation, pregnant liquor is passed to a large tank, the liquor is seeded and precipitation continues in the same tank for a predetermined period of time with agitation of the slurry during precipitation. The contents of the tank are then removed and the precipitated alumina hydrate is removed from the liquor. The liquor remaining, referred to as spent liquor, is recycled to the digestion steps of the Bayer process after reconcentrating and addition of makeup caustic. The alumina hydrate recovered is classified into product and seed. In a continuous system, pregnant liquor is treated in a series of interconnected tanks through which the pregnant liquor flows. In each tank, precipitation of alumina hydrate is taking place. Examples of continuous precipitation systems are those shown by Cowles in Patent No. 1,943,786 and Harms in Patent No. 2,606,820.

The manner in which seed is added to the pregnant liquor has a definite effect upon the rate of alumina precipitation and the particle size of the product. In both batch and continuous systems, the practice is to charge the seed into the precipitators as a slurry or suspension in spent caustic liquor. This is the condition in which the classified fine hydrate is normally recovered from the classification system. This method gives a relatively slow initial rate of precipitation and the mean particle diameter of the product is comparatively small.

The spent caustic liquor used as the medium to carry the seed to the pregnant liquor is liquor which has passed through the precipitation and classification stages, and has had about half of the alumina precipitated therefrom. The bulk of the spent liquor is returned to the initial digestion step after replenishing amounts of caustic soda have been added thereto, and contains various types of organic matter introduced into the liquor stream during processing.

Most of this organic matter is a complex mixture of solubilized or dissolved sodium organic substances, including salts, which are formed in the caustic liquor from the organic matter, such as the humus, present in the aluminous ore, and from starch which is employed as a flocculating agent in removing the red mud residue of the ore from the liquor. The process liquor is thus contaminated with these organic substances. These organic materials are present in various forms from complex high molecular weight compounds to more or less ultimate products, since they are molecularly degraded by the caustic and high temperatures employed in the process to such lower molecular weight compounds as sodium oxalate, glycolates, acetates and inorganic carbonate.

The more or less ultimately degraded organic materials in solution are to be collectively referred to hereinafter as "sodium oxalate" since this fraction of organic material in the liquor as determined by analysis is collectively reported as sodium oxalate. In addition, this sodium oxalate fraction of the organic matter in the liquor is the one with which the present invention is concerned. It is to be understood, however, that the term is inclusive of other forms of organic matter content in the liquor having an effect similar to the oxalate, whether identified or not. The sodium oxalate is precipitated from the liquor as very fine particles at the temperatures and caustic soda concentrations of the pregnant liquor in the alumina precipitation phase. They act as nuclei for precipitation of alumina-trihydrate and result in an undesirably fine and slowly settling alumina hydrate precipitate.

Furthermore, this finely divided sodium oxalate is more or less concentrated in the spent liquor fraction containing the fine alumina hydrate, that is, the seed slurry, obtained in the hydrate classification system. In continuous precipitation systems, the finely divided sodium oxalate would be expected to concentrate in the part of the system where the fine alumina hydrate would be found. If internal classification were used in a continuous system, it would be expected that the sodium oxalate would be found concentrated in the system where the fine alumina hydrate would be formed. In an external classification system of a continuous precipitation system, the sodium oxalate again would be found where the fine alumina hydrate would be concentrated. The presence of this finely divided sodium oxalate in the seed slurry is a definite detriment in the precipitation stage, and interferes with the desired objective of obtaining a faster settling and coarser alumina hydrate precipitate.

Although the presence of fine sodium oxalate in the seed slurry has a detrimental effect on precipitation, there is another condition which interferes with the initial precipitation rate of a pregnant liquor. Thus, the seed slurry obtained from the classification systems of both batch and continuous systems are stored in surge tanks for future use. The storage of the seed is one of the causes of the seed becoming aged. The use of aged seed, it has been determined, in the precipitation steps of batch or continuous systems, results in an induction period. This induction period may be defined as the time required after addition of seed to pregnant liquor, for the precipitation rate to become a maximum. It is desirable during the precipitation step to have seed present which has "active" alumina surfaces. When seed having "active" alumina surfaces is present in the pregnant liquor, the induction period is substantially eliminated and thus a faster initial precipitation rate is effected of the contained alumina in the pregnant liquor. This invention describes a method of accomplishing this desired condition of the seed, i.e. having active surfaces, and this condition is beneficial whether the seed slurry has sodium oxalate present or not.

Therefore, it is an object of this invention to provide a method of minimizing the detrimental effect of the solid sodium oxalate present in the spent liquor containing the seed hydrate, to improve precipitation by achieving a coarser and faster settling alumina hydrate.

A further object of this invention is to provide a method of overcoming the adverse effect in alumina precipitation caused by the presence of finely divided sodium oxalate and other organic impurities of like nature in the seed slurry, which method is very effective.

It is another object of this invention to provide a method of producing a seed slurry to be used in the precipitation of alumina hydrate which contains "active" alumina surfaces.

Another object of this invention is to provide a method of preparing a seed slurry which can be added to pregnant liquors in the production of alumina, which substantially eliminates an induction period in the precipitation of alumina hydrate, and permits a faster initial precipitation rate.

Another object is to provide an improved material for seeding pregnant aluminate liquors, which will yield an alumina hydrate precipitation product that is coarser and faster settling.

Other objects of the invention will become apparent from a consideration of the following detailed description and examples of the invention.

It has now been found according to the invention that alumina hydrate seed slurries containing finely divided sodium oxalate may be treated to produce a faster settling and coarser alumina hydrate precipitate, by preheating the seed slurry before addition to the pregnant liquor. The seed slurry is preheated to a temperature sufficient to dissolve a portion of the sodium oxalate, at present determined to be from approximately 70° to 100° C. (158 to 212° F.) with an optimum range of approximately 88–100° C. (190–212° F.) before charging the slurry to the precipitators containing the pregnant liquor. This treatment effectively redissolves a portion of the fine solid sodium oxalate which has crystallized out of the liquor. The oxalate in solution does not exert the adverse effect that is characteristic of the fine sodium oxalate particles, which according to the results of tests, are partially responsible for the production of an undesirably fine alumina hydrate in precipitation and consequent slow settling characteristics in the classification system.

It is also a concept of this invention that the heating of a seed hydrate slurry in a caustic liquor aside from dissolving a portion of the oxalate results in a seed containing seed surfaces of greater activity. It is believed that the greater activity of the surfaces of the heated seed is due to the fact that part of the aged surface of the alumina becomes dissolved by the heating step whereby a new surface of alumina is presented on each seed particle. This new surface which has not had time to age has a greater activity than an aged seed surface. It may be also postulated that although it is possible that some of the seed surface dissolves, that another explanation of the phenomenon is that poisons adsorbed on the surface of the seed become dissolved in the solution due to the heating step. These poisons referred to may possibly be of unknown ingredients in the caustic aluminate liquors which deposit on the seed surfaces and have a tendency to deactivate the surface. However, it is not intended to limit the invention to the foregoing mechanisms, it being sufficient to state that the process of the invention through seed heating produces the unobvious beneficial results described.

In ordinary practice, a seed slurry containing oxalate, which is present due to the above stated reasons, is charged unheated to the pregnant liquor. As a specific example, it was the practice to charge the precipitators with secondary thickener (ST) seed slurry at about 60° C. and with tray thickener (TT) seed slurry at about 52° C. This invention in a specific embodiment comprises preheating an ST or TT seed slurry, and, if desired, also primary thickener (PT) product hydrate as seed slurry to a temperature, such as above-mentioned and holding at this temperature for a time sufficient to dissolve a portion of the oxalate before charging to the precipitators. The types of seed referred to as primary, secondary and tray thickener seed are obtained from a conventional classification system used to classify the precipitated alumina hydrate product and are merely separated hydrate fractions of successively smaller particle size. Thus, the seed obtained from the primary thickener is product of relatively larger particle size, which is not consistently used as seed, while the seed obtained from the secondary thickener is of smaller average size and the tray thickener seed is the hydrate of smallest average particle size.

The temperature preferred for optimum results is approximately 190–212° F. However, the invention is not limited to heating to these particular optimum temperatures, since heating the seed slurries to any temperature, which is sufficient to dissolve an appreciable portion of the solid sodium oxalate or produce a seed containing active alumina surfaces within a practical holding time, suffices to obtain the improved results of a coarser, faster settling alumina hydrate precipitation product, and elimination of the induction period.

By varying the amount of seed, the initial temperature of the pregnant liquor, and the pregnant liquor caustic soda concentration, the invention may be productive of the following results. Circumstances will dictate which result is most advantageous:

(1) Using an equivalent amount of heated seed (seed charge), a much coarser and faster settling alumina hydrate precipitation product is obtained compared to that obtained without the preheating of the seed slurry, without appreciable loss in yield, that is, the percentage of alumina recovered based on the total alumina content of the pregnant liquor.

(2) By increasing the amount of heated seed to a limited extent, a coarser product is still obtained, together with an increase in yield. The same result can be achieved without increasing the amount of heated seed by lowering the filling temperature (initial pregnant liquor temperature) slightly, or by slightly increasing the caustic soda concentration of the pregnant liquor; or by any combination of these three operations.

(3) By further increasing the amount of heated seed up to a certain point, a marked improvement in precipitation yield will be obtained, and the particle size of the product will not differ greatly from that of the alumina product obtained without seed slurry preheating. The same result can be realized without increasing the amount of heated seed by a substantial lowering of the filling temperature, or by a substantial increase of the pregnant liquor caustic soda concentration, or by any combination of these three operations.

The following specific examples constitute complete specific embodiments of the invention, but are not to be regarded as limiting the same.

EXAMPLE 1

Identical samples of plant secondary thickener seed slurries known to contain solid sodium oxalate were collected. One sample was held at 60° C., the other sample was heated to approximately 94° C. and intermittently agitated at that temperature over a period of two hours. When used in equal amounts to charge pregnant plant liquor having a caustic soda concentration of 172.9 g./l. and an A/C ratio of 0.632 (weight ratio of alumina-to-caustic soda) and a filling temperature of 155° F. in a precipitation test, the two seed slurries gave essentially the same precipitation yield over a period of forty three hours. However, the alumina product obtained from the liquor charged with the seed slurry at a temperature of 60° C. had a settling time of 400 seconds, whereas the alumina product from the pregnant liquor charged with seed slurry at 94° centigrade settled in 165 seconds. This settling time is measured as the time for solids in a 200 ml. sample to settle completely. In a special settling test (see note 6 in Table 1 below) conducted to determine the amount of solids not settled after a given length of time, the concentration of unsettled solids in the seeded liquor from the 60° C. seed charge was found to be 22 grams per liter; while that from seeded liquor using the 94° C. seed charge was only 2 grams per liter. The product of the high temperature seed charge was much coarser than that obtained by charging the seed at the lower temperature. The data for the foregoing tests are summarized in Table 1.

*Table 1*

EFFECT ON PRECIPITATION OF PRE-HEATING PLANT ST SEED SLURRY TO 94° C.

| Time (hours) | Seed Temp. (° C.) | A/C | D (microns) (See Note 2) | D_L, 5% U.S. (microns) (See Note 3) | +200 Mesh (Weight Percent) (See Note 4) | +325 Mesh (Weight Percent) (See Note 4) | Settling Time (5) (seconds) | Suspended Solids (6) (g./l.) |
|---|---|---|---|---|---|---|---|---|
| 0 | | ¹0.632 | 45.4 | 46 | 44.0 | 80.7 | | |
| 43 | 60 | 0.328 | 51.1 | 43 | 58.2 | 86.9 | 400 | 22 |
| 43 | 94 | 0.326 | 63.8 | 50 | 62.9 | 95.0 | 165 | 2 |

NOTES:
(1) Initial caustic concentration was 172.9 g./l. (expressed as $Na_2CO_3$).
(2) $D_m$ = mean particle diameter.
(3) $D_L$, 5% U.S. = the diameter of the largest particle in that size fraction, i.e. the upper limiting diameter of the 5% undersize fraction. The 5% undersize fraction is the finest 5% fraction of the material.
(4) 20 gram sample shaken 20 minutes on Ro-Tap, using 5″ sieves.
(5) Time required for the solids contained in a 200 ml. sample to settle completely.
(6) Solids concentration about 6 inches below the surface of the liquor in the precipitator after air agitation in precipitators had been discontinued 5 minutes.

EXAMPLE 2

Identical samples of plant ST seed slurry known to contain solid sodium oxalate were collected. One sample was held at 60° C. The other sample was heated to approximately 95° C. and shaken several times at that temperature. Chemical analyses indicated that approximately half of the solid sodium-oxalate present in the seed slurry held at 60° C. was dissolved by heating to 95° centigrade. These results suggest that one source of the beneficial effects in precipitation resulting from heating the seed slurry is the dissolution of the solid sodium-oxalate.

EXAMPLE 3

This example is cited to show the effects of seed heating with respect to the induction period and rate of precipitation on both slurries containing oxalate and slurries not containing oxalate. Table 2 shows the data from four experimental runs. Runs 1 and 2 were data obtained using seed slurries of hydrate seed in spent liquor. Run 1

*Table 2*

EFFECT OF SEED HEATING ON RATE OF PRECIPITATION

[Initial temp.=156° F.; final temp.=144° F. Data from Exp. 346.]

| Run No. | Time (hours) | Character of seed | Seed Temp. (° C.) | C^a, g./l. | A/C^b | Δ(A/C) | Al₂O₃ Pptd. (g./l.) |
|---|---|---|---|---|---|---|---|
| 1 | 0 | Unwashed | 52 | 183.0 | ᶜ0.587 | | |
| 2 | 0 | Unwashed | 95 | 183.0 | ᶜ0.604 | | |
| 3 | 0 | Washed | 52 | 183.2 | ᶜ0.588 | | |
| 4 | 0 | Washed | 95 | 183.2 | ᶜ0.596 | | |
| 1 | 1 | | | 183.6 | 0.570 | 0.017 | 3.1 |
| 2 | 1 | | | 186.5 | 0.545 | 0.059 | 10.8 |
| 3 | 1 | | | 185.0 | 0.566 | 0.022 | 4.0 |
| 4 | 1 | | | 186.8 | 0.542 | 0.054 | 9.9 |
| 1 | 4 | | | 187.8 | 0.491 | 0.096 | 17.6 |
| 2 | 4 | | | 189.2 | 0.455 | 0.149 | 27.3 |
| 3 | 4 | | | 187.8 | 0.488 | 0.100 | 18.3 |
| 4 | 4 | | | 189.0 | 0.453 | 0.143 | 26.2 |
| 1 | 12 | | | 190.9 | 0.401 | 0.186 | 34.0 |
| 2 | 12 | | | 192.1 | 0.391 | 0.213 | 39.0 |
| 3 | 12 | | | 190.7 | 0.406 | 0.182 | 33.3 |
| 4 | 12 | | | 191.2 | 0.389 | 0.207 | 37.9 |
| 1 | 24 | | | 192.0 | 0.373 | 0.214 | 39.2 |
| 2 | 24 | | | 193.1 | 0.354 | 0.250 | 45.8 |
| 3 | 24 | | | 191.8 | 0.371 | 0.217 | 39.8 |
| 4 | 24 | | | 192.7 | 0.357 | 0.239 | 43.8 |
| 1 | 43 | | | 190.3 | 0.362 | 0.225 | 41.2 |
| 2 | 43 | | | 189.0 | 0.334 | 0.270 | 49.4 |
| 3 | 43 | | | 189.1 | 0.360 | 0.228 | 41.8 |
| 4 | 43 | | | 189.5 | 0.344 | 0.252 | 46.2 |

ᵃ C=caustic concentration in g./l. (expressed as $Na_2CO_3$).
ᵇ A/C=weight ratio of dissolved alumina to caustic (expressed as $Na_2CO_3$).
ᶜ The difference in A/C ratio of the initial liquors (i.e., at time 0) is due to some dissolution of alumina hydrate seed in the heating step.

was an unheated seed slurry having a temperature of 52° C. before being added to the pregnant liquor. Run 2 was also a spent liquor seed slurry as in run 1, however having been heated to a temperature of 95° C. before being added to the pregnant liquor. Runs 3 and 4 are similar to runs 1 and 2, except the seed used was deliquored and washed to dissolve oxalate and other impurities from the hydrate seed. The washed seed was reslurried in spent liquor and consequently was substantially free of solid oxalate. The purpose of using washed seed was to show that seed heating may be practiced on seed slurries which contain little or no oxalate and that beneficial results are obtained.

The effect of seed heating on overall or gross rate of precipitation is indicated in Table 2 and Figures 1 and 2 of the drawing. The data for the runs using unheated seed demonstrate the retarded rate of precipitation, that is, an induction period. The runs using heated seed show no evidence of an induction period. The faster rate in the initial period of precipitation obtained with heated seed is clearly evident from the data. Thus, after 1 hour, the change in A/C (Δ(A/C)) was much greater for the heated seed (both unwashed and washed) than the unheated seed (unwashed and washed). Also the amount of hydrate precipitated, that is, the yield of alumina precipitated is increased with the heated seed. Figure 1 shows the results after 24 hours of runs 3 and 4 and clearly brings out the induction period with the unheated seed as shown by the flat slope of the curve, and the absence of an induction period with the heated seed as shown by the steep slope in the same period. Figure 2 is a graphic representation of runs 3 and 4 of the amount of alumina hydrate precipitated plotted against time. Clearly, the heated seed precipitated a greater amount of hydrate due to the faster rate of precipitation at the outset caused by the elimination of an induction period, whereas the unheated seed showed a slower initial rate of precipitation due to a pronounced induction period, which resulted in less hydrate being precipitated over the total period, that is, a lower yield of alumina.

It has been found that the instantaneous rate of precipitation is directly proportional to the amount of seed surface per unit volume of liquor. As an approximation, the change in A/C ratio after an hour's time should be proportional to the seed surface and to the activity of the seed. Consequently, the change in A/C ratio divided by the seed surface should be constant, when seed activity is relatively constant.

Table 3

EFFECT OF SEED HEATING ON INITIAL PRECIPITATION RATE

[Temperature=156° F. Data from experiment 346.]

| Run No. | Character of Seed | Seed Temp. (° C.) | Δ(A/C) (First Hour) | Avg. Seed Surface $S^1$ (first hour) | Δ(A/C)/S (first hour) |
|---|---|---|---|---|---|
| 1 | Unwashed | 52 | 0.017 | 67,000 | $2.5 \times 10^{-7}$ |
| 2 | Unwashed | 95 | 0.059 | 98,000 | $6.0 \times 10^{-7}$ |
| 3 | Washed | 52 | 0.022 | 66,000 | $3.0 \times 10^{-7}$ |
| 4 | Washed | 95 | 0.054 | 86,000 | $6.3 \times 10^{-7}$ |

[1] Expressed as cm.² of hydrate surface per liter of liquor.

Table 3 compares the change in A/C ratio during the first hour for heated and unheated seeds. The ratio Δ(A/C)/S clearly increased when the seed was heated; in fact, it more than doubled. This is good evidence of the increased activity of the heated seed.

EXAMPLE 4

Table 4

DATA SHOWING TYPICAL INDUCTION PERIOD FOR UNHEATED (WASHED SEED)

[Temp. of seed slurry added=150° F.]

| Time t (min.) | A/C | Δ(A/C)[1] | Δt | $\frac{\Delta(A/C)}{\Delta t}$ | |
|---|---|---|---|---|---|
| 0 | 0.632 | | | | Initial caustic=170.6 g./l. Approximately normal charge of ST seed used. (112 g. of dry seed per liter of pregnant liquor.) |
| 20 | 0.623 | 0.009 | 20 | 0.00045 | |
| 40 | 0.605 | 0.018 | 20 | 0.0009 | |
| 80 | 0.557 | 0.048 | 40 | 0.0012 | |

[1] Contrary to usual practice, Δ(A/C) is defined in this table as (A/C)$_a$ −(A/C)$_n$.

Table 4 gives data showing an induction period observed with unheated seed ST seed. The induction period is indicated by the increasing value of the instantaneous precipitation rate Δ(A/C)/Δt. In the absence of an induction period this quantity would have its largest value at the beginning, and fall off with time. Instead, the value of the instantaneous rate increases with time. This is a very good criterion of an induction period.

The above results demonstrate achievement of the objects of the present invention in that the heating of seed slurries to be added to the precipitators results in a much coarser and faster settling hydrate and an elimination of the induction period. Although the above-cited examples are intended to provide details of the invention, they are not to be considered as a limitation thereof, since the invention is applicable broadly to any heating of the seed slurries such that an increased precipitation rate or a coarser product is produced.

The elimination of the detrimental effect of the sodium oxalate by seed heating and for the production of active alumina surfaces with resulting production of a coarser and faster settling alumina hydrate and a faster precipitation rate in the precipitation phase of the process is a distinct contribution and improvement in the alumina recovery art. A larger sized hydrate product considerably reduces dust losses in calcination, and also in handling the alumina at the reduction works. It prevents overproduction of hydrate of the finer seed particle size, and increases recovery of reduction grade alumina.

Various modifications may be made without departing from the spirit of the invention, the scope of which is to be construed by the appended claims.

What I claim is:

1. A process of precipitating alumina hydrate from a pregnant caustic aluminate liquor, wherein the liquor is at a temperature at which the alumina hydrate may be precipitated by seeding said liquor with an alumina hydrate slurry, which comprises heating an alumina hydrate slurry, before addition to the said liquor, to a temperature above the temperature of said liquor, and adding said heated slurry to said liquor.

2. The process of claim 1 wherein the slurry is heated to a temperature of from 70–100° C.

3. In a process of precipitating alumina hydrate from a pregnant caustic aluminate liquor, wherein the liquor is at a temperature at which the alumina hydrate may be precipitated by seeding said liquor with an alumina hydrate slurry, the improvement of increasing the initial precipitation rate in the liquor to which the seed slurry is added, comprising heating an alumina hydrate seed slurry, before addition to the said liquor, to a temperature above the temperature of said liquor, and adding said heated slurry to said liquor.

4. The process of claim 3 wherein the slurry is heated to a temperature of 70–100° C.

5. The process of precipitating a relatively coarser and faster settling alumina hydrate product from a pregnant caustic aluminate liquor, wherein the liquor is at a temperature at which the alumina hydrate may be precipitated by seeding said liquor with a slurry of solid alumina hydrate seed particles, which comprises pretreating an alumina hydrate seed slurry, before addition to said liquor, by heating the said slurry to a temperature of 70–100° C., and adding said heated slurry to said liquor which is at a lower temperature.

6. In a process of precipitating alumina hydrate from a pregnant caustic aluminate liquor, wherein said liquor is at a temperature at which the alumina hydrate may be precipitated by seeding said liquor with an alumina hydrate slurry contaminated with solid organic materials which act as seed particles for the alumina content of said caustic liquor, the improvement comprising heating an alumina hydrate seed slurry contaminated with solid organic materials, before addition to said caustic liquor, to a temperature above the temperature of said liquor and sufficient to dissolve a portion of the solid organic materials, and adding said heated slurry to said liquor.

7. The process of claim 6 wherein the seed slurry is heated to a temperature of 70–100° C.

8. In a process of precipitating alumina hydrate from a pregnant caustic aluminate liquor, wherein said liquor is at a temperature at which the alumina hydrate may be precipitated by seeding said liquor with an alumina hydrate slurry contaminated with solid organic materials which act as seed particles for the alumina content of said caustic liquor, the improvement which comprises heating an alumina hydrate seed slurry contaminated with solid organic materials, before addition to said caustic liquor, to a temperature above the temperature of said liquor and sufficient to dissolve a portion of the solid organic materials, and adding said heated slurry to said liquor, whereby a relatively coarser and faster settling alumina hydrate product is precipitated.

9. The process of claim 8 wherein the seed slurry is heated to a temperature of 70–100° C.

10. The process of claim 8 wherein the organic material is sodium oxalate.

11. In a process of precipitating alumina hydrate from a pregnant caustic aluminate liquor, wherein the said liquor is at a temperature at which the alumina hydrate may be precipitated by seeding said liquor with an alumina hydrate slurry contaminated with solid organic materials, the improvement of increasing the initial precipitation rate in the liquor to which the seed slurry is added, comprising heating an alumina hydrate seed slurry contaminated with solid organic materials, before addition to said caustic liquor, to a temperature above the temperature of said liquor and sufficient to dissolve a portion of the solid organic materials, and adding said heated slurry to said liquor.

12. The process of claim 11 wherein the seed slurry is heated to a temperature of 70–100° C.

13. The process of claim 11 wherein the organic material is sodium oxalate.

References Cited in the file of this patent

UNITED STATES PATENTS

| | | |
|---|---|---|
| 1,758,528 | Mecklenburg | May 13, 1930 |
| 2,352,867 | Stowe | July 4, 1944 |
| 2,707,669 | Houston et al. | May 3, 1955 |
| 2,806,766 | Anderson | Sept. 17, 1957 |

OTHER REFERENCES

Industrial and Engineering Chemistry, "Alumina," by Reese, K.M., September 1955, vol. 47, No. 9, pages 1672 to 1680.

UNITED STATES PATENT OFFICE
CERTIFICATE OF CORRECTION

Patent No. 2,935,376                          May 3, 1960

Reginald F. Roberts, Jr.

It is hereby certified that error appears in the printed specification of the above numbered patent requiring correction and that the said Letters Patent should read as corrected below.

Column 7, lines 61 and 62, footnote to Table 4 should appear as shown below instead of as in the patent:

[1] Contrary to usual practice, $\Delta(A/C)$ is defined in this table as $(A/C)_{t_2} - (A/C)_{t_1}$.

Signed and sealed this 4th day of April 1961.

(SEAL)
Attest:    ERNEST W. SWIDER

~~XXXXXXXXX~~                                    ARTHUR W. CROCKER
Attesting Officer                             Acting Commissioner of Patents